Nov. 21, 1939.　　　　S. RUSSELL　　　　2,180,852
COMBINED HARVESTER AND BALER
Filed Jan. 23, 1935　　　3 Sheets-Sheet 1
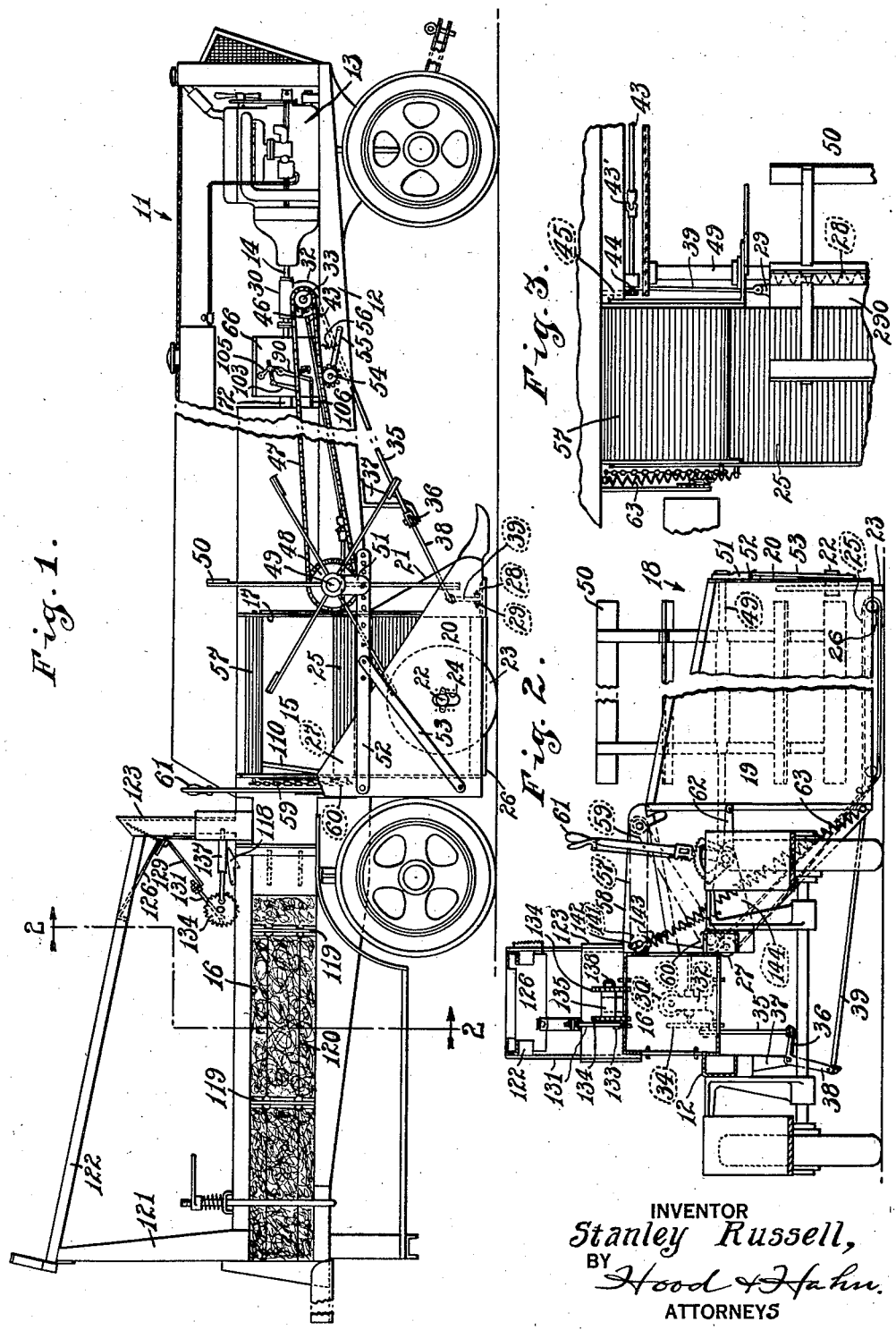
INVENTOR
Stanley Russell,
BY Hood & Hahn.
ATTORNEYS Nov. 21, 1939.  S. RUSSELL  2,180,852
COMBINED HARVESTER AND BALER
Filed Jan. 23, 1935  3 Sheets-Sheet 2
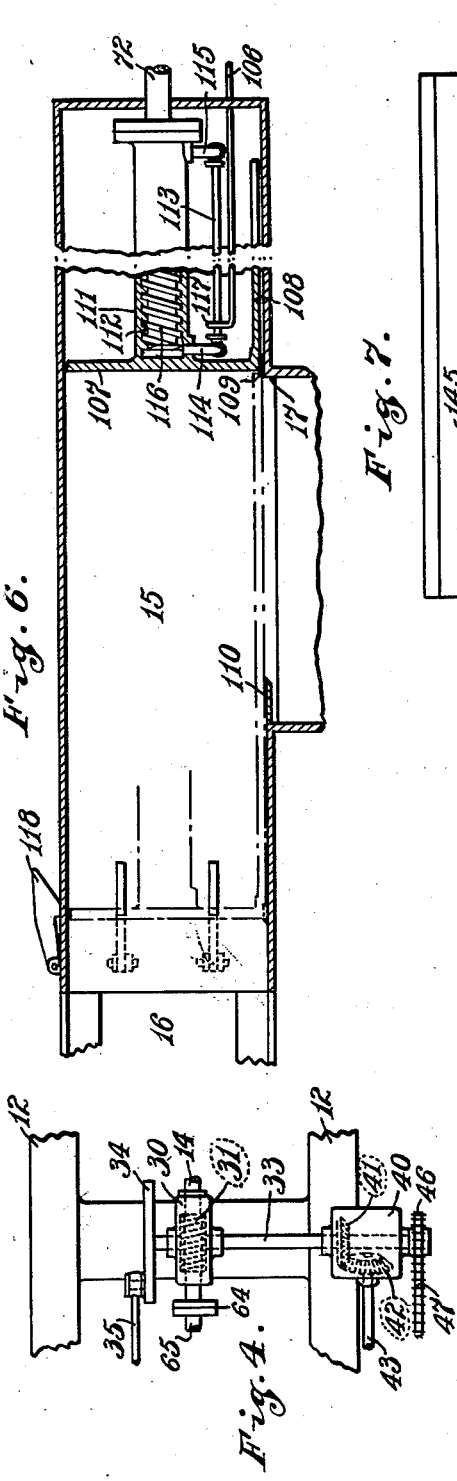
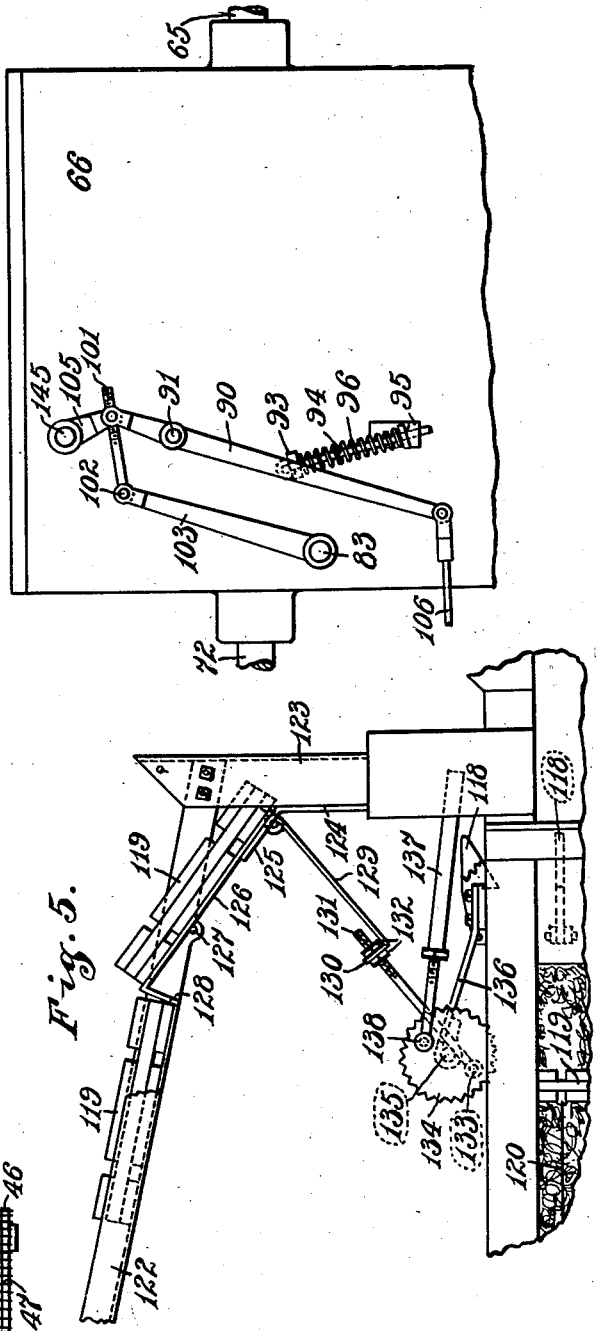
INVENTOR
Stanley Russell,
BY Hood + Hahn.
ATTORNEYS Nov. 21, 1939.  S. RUSSELL  2,180,852
COMBINED HARVESTER AND BALER
Filed Jan. 23, 1935  3 Sheets-Sheet 3
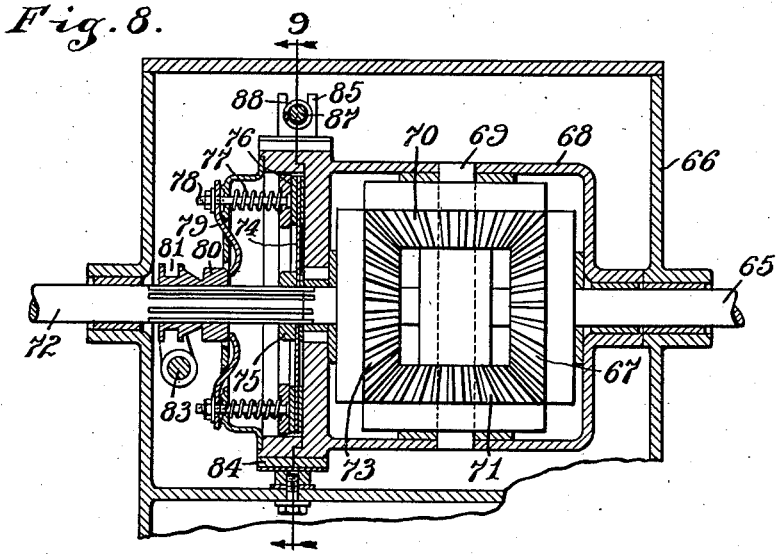
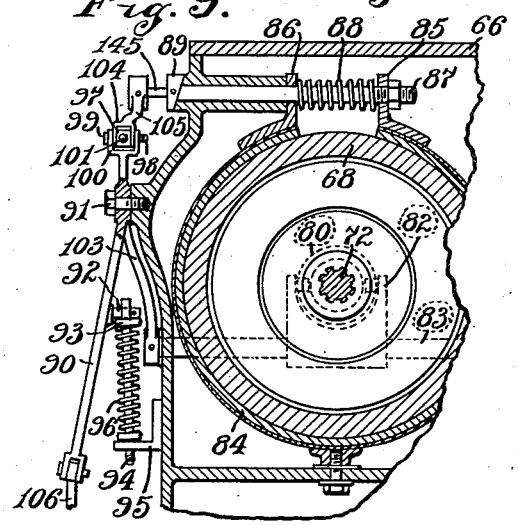
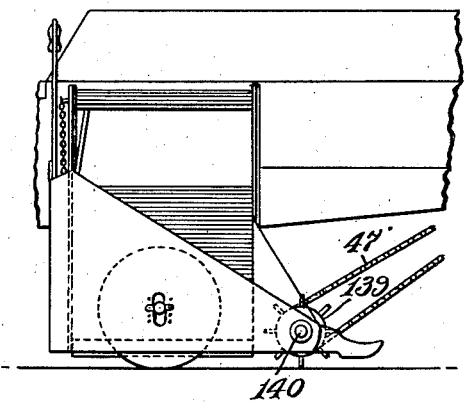
INVENTOR
*Stanley Russell,*
BY
*Hood & Hahn.*
ATTORNEYS Patented Nov. 21, 1939

2,180,852

UNITED STATES PATENT OFFICE 2,180,852

COMBINED HARVESTER AND BALER

Stanley Russell, Vincennes, Ind.

Application January 23, 1935, Serial No. 2,984

9 Claims. (Cl. 100—24)

The present invention relates to a combined harvester and baler for standing grass-like crops, such as straw and the like; and to a machine which is further adapted to pick up and bale, during travel of the machine, cured hay or the like.

Broadly stated, the object of the invention is to provide a machine of the character indicated which shall be more effective and more satisfactory in use than machines of similar character heretofore known. Specifically, it is an object of the present invention to provide a machine of the character indicated having certain refinements of construction over previous baling machines. Among the specific objects of the invention are:

To provide a machine of the character indicated in which, upon each retraction of the compressing plunger, there shall be left a completely open space, unobstructed by any straggling wisps of material, into which a spacer block may be dropped.

To provide, in the machine of the character indicated, automatic means for periodically dropping a spacer block into the baling chamber; that automatic means being operated by the movement of compressed material through the baling chamber.

To provide novel means for reciprocating the compressing plunger.

To provide, in a machine of the character indicated, a combined mower and conveyor for harvesting material and transferring it to the baler, the mower mechanism being driven through a novel and effective train.

To provide, in a machine of the character indicated, means whereby, upon each stroke of the compressing plunger, any material projecting outwardly from the baling chamber through the inlet port to said chamber will be cut off, so that there shall be no wisps of material trailing behind the compressing plunger.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation of a combined harvester and baler constructed in accordance with the present invention, parts of the organization being broken away for clarity of illustration;

Fig. 2 is a transverse section taken substantially on the line 2—2 of Fig. 1, and looking in the direction of the arrows;

Fig. 3 is a fragmental plan view of a portion of the organization, showing the drives for the conveyor mechanisms;

Fig. 4 is a fragmental plan showing portions of the driving trains for all of the power operated mechanisms on the machine;

Fig. 5 is an enlarged side elevation of the board-dropping mechanism, parts being broken away for clarity of illustration;

Fig. 6 is an enlarged horizontal section through the baling chamber, and showing a part of the plunger operating mechanism in section;

Fig. 7 is an enlarged side elevation of the casing for the plunger-operating transmission, showing a part of the control for such transmission;

Fig. 8 is a longitudinal section through the plunger-operated transmission;

Fig. 9 is a transverse section, taken substantially on the line 9—9 of Fig. 8, and looking in the direction of the arrows; and Fig. 10 is a fragmental side elevation of a modified form of the machine of the present invention.

Referring more particularly to the drawings, it will be seen that I have illustrated in Fig. 1 a complete combined harvester and baler comprising a wheeled vehicle, indicated generally at 11, which includes a frame 12 upon which is mounted a conventional internal combustion engine 13. The shaft 14, which is driven through the engine transmission, will hereinafter be referred to as the driving shaft of the organization.

Upon the vehicle is carried a long housing providing a chamber of rectangular cross section which may be referred to generally as a baling chamber. The baling chamber consists of two portions, unseparated from each other, the portion 15 being that portion into which the loose material to be baled is introduced and in which the compressing plunger works, and the portion 16 being that portion in which the compressed material is tied. It will be seen that the port 17 through which material is introduced into the chamber portion 15 is formed in a vertical side wall of the baling chamber; and I consider this construction to be quite important. In all commercial baling machines known to me heretofore, the material to be baled has always been introduced into the baling chamber through a hopper in the top wall of the chamber, thereby necessitating the elevation of the material to a point considerably above the baling chamber. Such a degree of elevation necessitates either special elevating mechanism, or the lateral elongation of that run of the endless belt conveyor by which the material is elevated, thereby increasing that portion of the width of the organization which comprises waste space.

In Fig. 2 I have indicated the harvesting and transferring unit generally by the reference numeral 18. This unit comprises an upstanding rear wall 19 and end walls 20 and 21. In the end wall 20 there is journaled an axle 22 upon which is mounted a supporting wheel 23 for the outer end of the unit 18. The axle 22 is adjustably positioned in a vertical slot 24 in the wall 20. An endless belt conveyor 25 forms the floor of the unit 18, and operates over rollers 26 and 27. That portion of the conveyor 25 which is immediately behind the mower unit 28 is parallel with said unit, and is held down by a strip 290 under which one edge of the conveyor runs, the remaining portion of the conveyor being inclined, is is clearly to be seen in Fig. 2, upwardly from the plane of the mower to the plane of the floor of the baling chamber.

The mower indicated comprises a stationary toothed shear plate and a laterally reciprocating cooperating toothed shear plate terminating, at its end adjacent the machine frame, in an ear 29. The driving shaft 14 extends into a housing 30, within which said shaft 14 carries a worm 31 (Fig. 4) cooperating with a worm wheel within a portion 32 (Fig. 1) of the housing 30. Said worm wheel is mounted on a shaft 33 at one end of which is carried a wheel (or, if desired, a simple crank). To the outer face of the wheel 34, adjacent the periphery thereof, is swiveled one end of a pitman 35, the opposite end of said pitman being pivotally connected with one arm 36 of a bell crank lever pivotally mounted on a bracket 37 depending from the frame 12. To the other arm 38 of said bell crank lever is connected one end of a link 39, the opposite end of which is connected to the ear 29. It will be obvious, that, as the wheel 34 rotates, the pitman 35 will reciprocate to oscillate the bell crank 36—38 to reciprocate the link 39 and the reciprocable element of the mower 28.

Referring, again, to Fig. 4, it will be seen that the shaft 33 extends into and through a housing 40, within which said shaft 33 carries a beveled pinion 41 meshing with a beveled gear 42 on a shaft 43. By reference to Figs. 1 and 3, it will be seen that the shaft 43 (in the length of which there is provided a universal joint 43') extends rearwardly along the frame 12 and carries, adjacent the unit 18, a pinion 44 meshing with a gear 45 carried on the roller 27 (see Fig. 2). Thus, the drive for the conveyor 25 is provided.

Without the housing 40, the shaft 33 carries a sprocket 46 which, through a chain 47, drives a sprocket 48 on a shaft 49 which supports a reel 50 cooperating with the mower 28 in a well known manner. The shaft 49 is supported upon standards 51 which are adjustably carried on arms 52 mounted on the end walls 20 and 21 of the unit 18. As will be seen by reference to Fig. 1, said arms 52 may be adjusted in position, being braced in any adjusted position by braces 53. I prefer to provide an idler sprocket 54, mounted upon an eccentric mounted on the frame 12, said eccentric being provided with a handle 55 which is urged upwardly by a spring 56, whereby the sprocket 54 is likewise urged upwardly to hold the chain 37 under proper tension.

Adjacent the inlet port 17, I provide what may be termed a canopy conveyor 57, the function of which is to aid in introducing material carried on the conveyor 25 through the opening. Said conveyor is carried by arms 58, and is driven by a chain 59 running over sprockets, one of which is driven by a gear 60 meshing with a corresponding gear carried on the roller 27. The inner end of the conveyor 57 is carried on a roll 141, the axle for which is mounted in slots 142, a spring 143 being connected to said axle and urging the same toward the bottoms of the slots 142.

The whole unit 18 is mounted for oscillation about the axis of the roller 27. A lever 61, suitably supported on a bracket 144 secured to the vehicle frame, has one arm 62 secured to an upright of the unit 18, and may be operated to adjust the position of said unit 18. A strong spring 63 aids in supporting said unit 18.

By reference to Fig. 4, it will be seen that the shaft 14 continues through the housing 30 and is connected, through a flexible joint 64, with shaft 65 which is journaled in a casing 66 (Fig. 8). Within said casing, said shaft 65 carries adjacent its extremity a beveled pinion 67. A housing 68 is suitably journaled, within the casing 66, for rotation with respect to the shaft 65, said housing being coaxial with said shaft. A pin or axle 69 is suitably mounted in the housing 68, the axis of said member 69 being perpendicular to, and intersecting the axis of the shaft 65. Upon said member 69 are journaled two beveled gears 70 and 71 meshing with diametrically opposite portions of the pinion 67.

A driven shaft 72 is journaled in the casing 66 in alinement with the shaft 65; and said shaft 72 extends into the housing 68, carrying, therewithin, a beveled gear 73 meshing with the gears 70 and 71 at points diametrically opposite the points at which gears 70 and 71 mesh with the pinion 67.

A clutch plate 74 is carried by a hub 75 which is mounted on the shaft 72 for rotation therewith. A presser ring 76 is associated with said clutch plate 74, being resiliently urged to press said clutch plate against the adjacent face of the housing 68 by a plurality of springs 77 mounted upon pins 78. Operating levers 79 cooperate with said pins 78 and with an actuating member 80 splined on the shaft 72. Said actuating member 80 is formed with a circumferential groove 81 in which are received the fingers of a yoke 82 mounted upon a rock shaft 83 journaled in the casing 66. It will be seen that, as the element 80 is moved toward the right in Fig. 8, the levers 79 will be rocked to move the pins 78, and presser ring 76, toward the left against the tendency of the springs 77, thereby releasing the clutch plate 74 from its engagement with the housing 68.

Surrounding the housing 68 is a brake band 84 provided, adjacent its opposite ends, with rigid ears 85 and 86, through which projects a rock shaft 87. A spring 88 is mounted on said rock shaft 87 between the ears 85 and 86, and tends to separate said ears, thereby releasing the brake band 84. The rock shaft 87 carries a cam 89 cooperating with a corresponding surface on the casing 66 so that, when the shaft 87 is moved in a counterclockwise direction as viewed in Figs. 7 and 8, said cam 89 will cause said shaft to move axially to the left as viewed in Fig. 9, thereby drawing the ear 85 toward the ear 86 to tighten the brake band 84 about the housing 68.

A lever 90 is pivoted, through the medium of a bolt 91, to the external wall of the casing 66. At a point below the pivotal mounting of said lever, said lever is provided with a yoke 92 which rides upon a collar 93 slidable on a pin 94 which is rockably mounted in a bracket 95 secured to the casing 66. A coiled spring 96 is sleeved on said pin 94, and urges the collar 93 upwardly. The bracket mounting for the pin 94 is substantially vertically below the bolt 91 so that, as the lever 90 passes a vertical position, in moving in either direction, the spring 96 comes into action to snap the lever to its limit position in that direction. That is, if the lever 90 is moved in a counterclockwise direction from its illustrated position in Fig. 7, the spring 96 will be compressed during movement of the lever until the lever passes a substantially vertical position. Thereupon, the tendency of the spring to expand tends to force the lever 90 to move farther in a counterclockwise direction; and the spring is so proportioned as to be capable of itself moving the lever 90 from a point just beyond dead center position to its limit position in either direction.

A nut 97 is swiveled on pins 98 and 99 carried by the yoke 100 at the upper end of the lever 90, and said nut is adjustably positioned on a link 101, said link being pivotally connected to one end of an arm 103 which is mounted on the rock shaft 83. The pins 98 and 99 also secure to the yoke 100, a yoke 104 on one end of an arm 105, the opposite end of which is carried upon a shaft 145 which is telescoped within the rock shaft 87. The shaft 145 is so keyed to the shaft 87 that the shaft 87 will rotate with the shaft 145, but said shaft 87 may move axially with respect to the shaft 145.

To the lower end of the lever 90 is pivoted a link 106.

Referring now to Fig. 6, it will be seen that there is mounted within the chamber 15 a compressing plunger 107 which, on its face adjacent the inlet port 17, is provided with a rearwardly extending skirt 108 long enough to prevent material from entering the chamber 15 behind the plunger 107. At the leading end of the skirt 108, the plunger 107 carries a shear plate 109 adapted to cooperate with a knife 110 positioned in the inlet port 17 so that, as the plunger 107 moves past the inlet port 17 in a compressing direction, any material projecting through the port 17 will be sheared between the plate 109 and knife 110.

On its rearward face, the plunger 107 is provided with a shank 111 which takes the form of a cylinder, internally threaded as at 112. I prefer to fill the cylinder 111 with a lubricating liquid, so that the screw threads will be constantly bathed in lubricant. For a reason which will hereinafter appear, I provide a pipe 113, the major portion of which lies parallel with the axis of the cylinder 111, but which is provided with angularly related portions 114 and 115, communicating, respectively, with opposite ends of the cylinder 111. The shaft 72 extends into the cylinder 111, and, at its extremity, carries a screw 116 cooperating with the internal threads 112 of the cylinder 111. It will be obvious that, as the shaft 72 rotates in a clockwise direction, as viewed from the right of Fig. 6, the plunger 107 will be moved toward the left in Fig. 6; and, as said shaft 72 rotates in a counterclockwise direction, the plunger will be retracted to the position illustrated in Fig. 6. The purpose of the pipe 113 now becomes clear. The screw 116 will fit the threads 112 fairly closely, and it is highly desirable to provide a by-pass for the lubricant within the chamber 112, whereby that lubricant may flow around the screw 116 from end to end of the cylinder.

The link 106 is provided with a laterally turned ear 117 which is either bifurcated or perforated to have a sliding fit on the main portion of the pipe 113. It will be seen that, as the plunger 107 nears one end of its stroke, the portion 114 of the pipe will strike the ear 117 to move the link 106 and the lower end of the lever 90 toward the right as viewed in Fig. 7; and, as the plunger 107 nears the opposite end of its stroke, the pipe portion 115 will strike the ear 117 to move the link 106 and the lower end of the lever 90 toward the left as viewed in Fig. 7.

The baling chamber is provided, in those three sides other than the side on which the knife 110 is mounted, with the usual tuckers 118; and it will be seen, from an inspection of the dot-and-dash lines of Fig. 6, that the plunger 107 moves, on its compressing stroke, just into contact with those tuckers.

Now, remembering, that, since all wisps projecting through the port 17 at the time when the plunger passed the knife 110 have been cut off, so that there can be nothing straggling behind the plunger, it will be apparent that, when the plunger is retracted, the space between the knife 110 and the tuckers 118 will be entirely clear. In all earlier baling machines known to me, it has been necessary to shut down the feeding mechanism and permit the plunger to operate from two to five times to clear the space between the inlet port and the tuckers, before a spacer board could be dropped into that space. In the present organization, such a space is left entirely clear upon each reciprocation of the plunger. Consequently, it is possible, in the present machine, to provide automatic mechanism for periodically dropping a spacing board into the baling chamber at a point between the tuckers 118 and the knife 110. Such an automatic mechanism is illustrated generally in Fig. 1, and in detail in Fig. 5.

In Fig. 1, I have shown two boards 119 within the portion 16 of the baling chamber, and I have also shown wires 120 surrounding the bales between the boards. As each bale is ejected from the portion 16 of the baling chamber, a board 119 falls loosely behind it. At the tail end of the baling frame there is mounted a pair of uprights 121 which support the rear end of an inclined chute 122 into which the boards which so fall from the baling chamber are introduced by an attendant. They slide down the chute 122 until they strike the upper end of a vertical chute 123, the rear wall 124 of which is bent rearwardly adjacent its upper end, as at 125.

The floor of the lower end of the chute 122 consists of a tiltable platform 126 mounted for oscillation about axis 127; and at its rear end, said platform 126 is provided with a depending skirt 128.

Adjacent its forward end, there is hinged to the under surface of the platform 126 a strap 129 having an upturned ear 130 at its lower end. Through an aperture in the rear 130 passes a rod 131, threaded at its one end for the reception of adjusting nuts 132 which embrace the ear 130. The opposite end of the rod 131 is pivoted, as at 133, on a wheel 134 formed with a serrated periphery. In the illustrated embodiment of my invention, I have shown two wheels 134 mounted upon a common axle which is journaled in a tube 135 embraced by a leaf spring 136 which tends to urge said axle and said wheels 134 downwardly so that the peripheries of the wheels 134 project into the baling chamber and into contact with the compressed material moving therethrough.

A rod 137, which is illustrated as a compound rod, adjustable in length, has one end pivoted, as at 138, to the other wheel 134; and the opposite end of the rod projects, at times, into the vertical chute 123, where it blocks a board in said chute.

The operation of this unit will be obvious.

Assuming the chute 122 to be at least partially full of boards, it will be seen that only one board 119 will rest on the platform 126. That board is in contact with the forward wall of the chute 123, and the angle of inclination of the chute 122 is such that the board 129 cannot fall into the chute 123. As the material moving through the baling chamber engages and rotates the wheels 134, the compound element 129—131 will be drawn downwardly to tilt the platform 126 to the position illustrated in Fig. 5. Simultaneously, the rod 137 is projected into blocking position in the chute 123. When the platform 126 reaches the illustrated position, the board 119 thereon will slide downwardly and fall into the chute 123, where it wil be held supported on the rod 137. As the platform 126 tilts into the illustrated position, the skirt 128 will prevent forward movement of the next board 119 in the chute 122. As the material in the baling chamber is moved farther, in successive steps, by the plunger 107, the wheels 134 are further rotated to return the platform 126 into the general plane of the floor of the chute 122 to permit the next board to slide into position on said platform. Simultaneously, the pin 137 is withdrawn from blocking position to permit the board in the chute 123 to drop down through the chute 123. Of course, since the movement of the wheels 134 is a step-by-step movement, the final movement of those wheels which ultimately withdraws the pin 137 from beneath the board in the chute 123 will take place as the plunger 107 moves past the mouth of the chute 123, so that the board, as it drops past the pin 137, will drop onto the plunger 107. As the plunger is then retracted, the board will drop into the space left clear by the retraction of the plunger.

With the exception of a detailed description of the operation of the plunger-actuating mechanism, the operation of all of the parts of the present machine has heretofore been described. The operation of the plunger-actuating mechanism will now be described in detail.

It is to be assumed that the shaft 14, and therefore the shaft 65 which is rigidly connected thereto, will be in continuous undirectional rotation. When the cylinder 111 is in the position illustrated in dot-and-dash lines in Fig. 6, the controlling elements will be in the position illustrated in Fig. 7. The clutch plate 74 will be disengaged and the brake band 84 will be tightened to hold the housing 68 against rotation. Under such circumstances, clockwise rotation of the pinion 67 will drive the gear 73 in a counterclockwise direction through the gears 70 and 71; and the shaft 72 will rotate in a counterclockwise direction to drive the screw 116 (which, as is shown, is a left-hand screw) in a counterclockwise direction to retract the cylinder 111 and plunger 107 toward the position illustrated in solid lines in Fig. 6. As the plunger 107 approaches that position, the portion 114 will strike the ear 117 (which, of course, at that time will be in a position farther to the left than that illustrated). Engagement of the pipe portion 114 with the ear 117 and continued movement to the right of the plunger 107 will shift the lever 90 in a counterclockwise direction until said lever passes a substantially vertical position, whereupon the spring 96 will snap said lever to its extreme position in that direction. The rock shaft 83 will thus be rocked in a counterclockwise direction and the rock shafts 145 and 87 will be rocked in a clockwise direction; whereby the clutch plate 74 will be forced into engagement with the housing 68 and the brake band 84 will be relaxed. Thereupon, the housing 68 will begin to rotate in a clockwise direction, the gears 70 and 71 being held against rotation about their own axis, and the shaft 72 will be driven in a clockwise direction through the clutch 74. Of course, clockwise rotation of the screw 116 will move the plunger 107 and cylinder 111 toward the left in Fig. 6 until the pipe portion 115 engages the ear 117 to shift the lever 90 in a clockwise direction beyond its dead center, whereupon the spring 96 will snap the lever 90 into the position illustrated in Fig. 7.

In Fig. 10 I have illustrated a modification of my machine, wherein the mower 28 and the reel 50 have been removed, and a pickup rake 139, mounted upon axles 140 has been substituted therefor. The rake 139 will be driven through a chain 47', corresponding to the chain 47 of Fig. 1. This form of my machine is intended for use in baling hay, or other crops which require curing before baling.

I claim as my invention:

1. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, means for transferring boards from said inclined chute to said vertical chute, and means operable, at times, to prevent a board in said vertical chute from dropping through said aperture and, at other times, to permit a board to drop through said aperture.

2. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, means operable by material moving through said chamber for transferring boards from said inclined chute to said vertical chute, and means operable by material moving through said chamber and effective, at times, to prevent a board in said vertical chute from dropping through said aperture and, at other times, to permit a board to drop through said aperture.

3. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, means controlling movement of boards from said inclined chute into said vertical chute, and means controlling movement of boards from said vertical chute into said chamber.

4. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, means operable by movement of material through said chamber and controlling movement of boards from said inclined chute into said vertical chute, and means operable by movement of material through said chamber and controlling movement of boards from said vertical chute into said chamber.

5. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, means operable by movement of material through said chamber to transfer boards, one at a time, from said inclined chute to said vertical chute, and means operable by movement of material through said chamber to block the exit end of said vertical chute at times, and to open the exit end of said vertical chute at other times.

6. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, a tiltable platform at the lower end of said inclined chute, means shiftable to block and unblock the lower end of said vertical chute, and means operable by movement of material through chamber to tilt said platform and to shift said locking means.

7. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, a tiltable platform at the lower end of said inclined chute, means shiftable to block and unblock the lower end of said vertical chute, and means operable by movement of material through said chamber to tilt said platform, at times, to deposit a board from said inclined chute in said vertical chute and to move said shiftable means, at such times, into blocking position, and at other times to move said shiftable means into unblocking position while moving said platform into position to prevent transfer of a board from said inclined chute into said vertical chute.

8. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, a tiltable platform at the lower end of said inclined chute, means shiftable to block and unblock the lower end of said vertical chute, a wheel having a serrated periphery projecting into the path of material moving through said chamber and adapted to be rotated by such movement of such material, and means connecting said wheel to control the positions of said platform and said blocking means.

9. In a baling machine, an elongated chamber, means for holding material in said chamber against movement therethrough in one direction, a plunger reciprocable in said chamber and movable a material distance from a point adjacent said holding means in said one direction, an aperture in the top wall of said chamber adjacent said holding means but spaced therefrom in the direction of movement of said plunger, a vertical spacer-board chute communicating with said aperture, an inclined spacer-board chute leading from a point adjacent the outlet end of said chamber to said vertical chute adjacent the upper end of said vertical chute, a tiltable platform at the lower end of said inclined chute, means shiftable to block and unblock the lower end of said vertical chute, a wheel having a serrated periphery, spring means urging said wheel into the path of material moving through said chamber, said wheel being adapted to be rotated by such movement of such material, and means connecting said wheel to control the positions of said platform and said blocking means.

STANLEY RUSSELL.

CERTIFICATE OF CORRECTION.

Patent No. 2,180,852. November 21, 1939.

STANLEY RUSSELL.

It is hereby certified that error appears in the printed specification of the above numbered patent requiring correction as follows: Page 5, first column, line 70, claim 6, for the word "locking" read blocking; and that the said Letters Patent should be read with this correction therein that the same may conform to the record of the case in the Patent Office.

Signed and sealed this 26th day of December, A. D. 1939.

(Seal)

Henry Van Arsdale,
Acting Commissioner of Patents.